(12) United States Patent
Huang et al.

(10) Patent No.: US 10,700,409 B2
(45) Date of Patent: Jun. 30, 2020

(54) BACK COVER FOR ELECTRONIC DEVICE AND ELECTRONIC DEVICE

(71) Applicant: Acer Incorporated, New Taipei (TW)

(72) Inventors: Shih-Ting Huang, New Taipei (TW); Ching-Chi Lin, New Taipei (TW); Chien-Wen Chen, New Taipei (TW); Chuan-Chun Wang, New Taipei (TW)

(73) Assignee: Acer Incorporated, New Taipei (TW)

( * ) Notice: Subject to any disclaimer, the term of this patent is extended or adjusted under 35 U.S.C. 154(b) by 37 days.

(21) Appl. No.: 16/221,616

(22) Filed: Dec. 17, 2018

(65) Prior Publication Data
US 2020/0106155 A1  Apr. 2, 2020

(30) Foreign Application Priority Data
Sep. 27, 2018  (TW) .............................. 107134186 A

(51) Int. Cl.
*H01Q 1/22* (2006.01)
*H01Q 1/24* (2006.01)
*G06F 1/16* (2006.01)
*H01Q 5/30* (2015.01)

(52) U.S. Cl.
CPC ......... *H01Q 1/2266* (2013.01); *G06F 1/1698* (2013.01); *H01Q 1/24* (2013.01); *H01Q 5/30* (2015.01)

(58) Field of Classification Search
CPC ...... H01Q 1/22; H01Q 1/2258; H01Q 1/2266; H01Q 1/24; H01Q 1/241; H01Q 1/243; H01Q 5/30; H01Q 5/335
See application file for complete search history.

(56) References Cited

U.S. PATENT DOCUMENTS

| | | | |
|---|---|---|---|
| 9,413,058 B1 * | 8/2016 | Kuo | H01Q 1/243 |
| 9,882,264 B2 * | 1/2018 | Gummalla | G06F 1/1656 |
| 2009/0066588 A1 * | 3/2009 | Cheng | H01Q 1/2266 343/702 |
| 2017/0279199 A1 * | 9/2017 | An | H01Q 5/335 |

FOREIGN PATENT DOCUMENTS

CN  107482304  12/2017

* cited by examiner

*Primary Examiner* — Hoang V Nguyen
(74) *Attorney, Agent, or Firm* — JCIPRNET

(57) ABSTRACT

A back cover includes a metal body having a first side, a second side, and a groove that is formed at the first side. The metal body further has a first radiator, a second radiator, and a ground radiator. The first radiator is disposed in the groove, and has a main portion and a support portion that cooperatively form a T-shape. The main portion includes a feeding end adjacent to a closed end of the groove. The second radiator is adjacently connected to the groove and is defined by the first and second sides, and an edge of the groove. The ground radiator is formed by a portion of the metal body excluding the first and second radiators. The second radiator and the support portion are connected to the ground radiator. The first and second radiators, and the ground radiator are serve as an antenna structure.

17 Claims, 5 Drawing Sheets

BACK COVER FOR ELECTRONIC DEVICE AND ELECTRONIC DEVICE

CROSS-REFERENCE TO RELATED APPLICATION

This application claims the priority benefit of Taiwan application serial no. 107134186, filed on Sep. 27, 2018. The entirety of the above-mentioned patent application is hereby incorporated by reference herein and made a part of this specification.

BACKGROUND OF THE DISCLOSURE

Field of the Disclosure

The disclosure relates to a back cover and an electronic device, and more particularly to a back cover which can constitute an antenna structure and an electronic device using such back cover.

Description of Related Art

In recent years, body of notebook computer is mostly made of metal, and appearance thereof is typically designed with a narrow frame to achieve a more beautiful look. In order to prevent performance of antenna from being affected by the shielding effect of the metal material, current practice in the market is to set the antenna of the notebook computer inside the system, but with this configuration, the antenna is easily interfered by internal noise of the system and signal quality of the antenna is directly affected. Another method is to support the antenna with a circuit board and move the antenna to a top side of a panel (the frame), which however makes it difficult for the frame space of a display panel to be reduced, and makes it difficult to achieve the design of narrow frame for the notebook computer. Therefore, it is an urgent issue to find out how to adjust the antenna structure and design the notebook computer with both a metal body and a narrow frame.

SUMMARY OF THE DISCLOSURE

The disclosure provides a back cover for electronic device having an antenna structure.

The disclosure provides an electronic device having the above-described back cover, thereby achieving the appearance with both a metal body and a narrow frame.

The back cover for electronic device of the disclosure includes a metal body. The metal body has a first side, a second side adjacent to the first side, and a groove formed at the first side. The metal body further has a first radiator, a second radiator, and a ground radiator. The first radiator is disposed in the groove. The first radiator has a main portion and a support portion. The main portion and the support portion cooperatively form a T-shape. The main portion includes a feeding end adjacent to a closed end of the groove. The first radiator is operated in a first band. The second radiator is adjacently connected to the groove and is defined by the first side, the second side, and an edge of the groove. The second radiator is operated in a second band. The ground radiator is formed by a portion of the metal body that excludes the first radiator and the second radiator. The second radiator and the support portion are connected to the ground radiator. The first radiator, the second radiator, and the ground radiator cooperatively serve as an antenna structure.

In an embodiment of the disclosure, a width of the groove is between 2 millimeters and 2.5 millimeters.

In an embodiment of the disclosure, a length of the main portion is between 10 millimeters and 12.5 millimeters. A width of the main portion is between 1.5 millimeters and 2 millimeters.

In an embodiment of the disclosure, a length of the first radiator is ¼ times a wavelength of the first band. A length of the second radiator is equal to a recess depth of the groove. The length of the second radiator is ¼ times a wavelength of the second band.

In an embodiment of the disclosure, a distance between the support portion and the feeding end of the first radiator is between ½ and ⅔ times a length of the body portion.

In an embodiment of the disclosure, a sum of a width of the second radiator and a width of a corresponding groove is less than or equal to 5 millimeters.

In an embodiment of the disclosure, the back cover further includes a non-conductor filler. The non-conductor filler is filled in the groove.

In an embodiment of the disclosure, the first side includes two first sides. The two first sides are opposite to each other. The second side is located between the two first sides and connected to the two first sides. The first radiator includes two first radiators. The second radiator includes two second radiators. One of the first radiators and a corresponding one of the second radiators as well as the other one of the first radiators and a corresponding one of the second radiators are symmetrically disposed on the metal body.

The electronic device of the disclosure includes the above-described back cover, a circuit board, and a coaxial transmitting wire. The circuit board includes a wireless communication module. The coaxial transmitting wire connects the antenna structure to the wireless communication module.

In an embodiment of the disclosure, the electronic device further includes a display screen. An orthogonal projection of the display screen with respect to the back cover does not overlap the antenna structure.

Based on the above, the structural design of the first radiator, the second radiator and the ground radiator of the back cover of the disclosure allows the metal body to be directly used as an antenna structure, so that a substrate carrying the antenna structure may be omitted, and thus a thickness of the electronic device may be reduced. In addition, since it is not required for the antenna structure to be placed at a frame of the electronic device, a width of the frame may be reduced, thereby achieving the effect of narrow frame. In addition, since the back cover is made of metal, a high-quality appearance may be achieved.

In order to make the aforementioned features and advantages of the disclosure more comprehensible, embodiments accompanying figures are described in detail below.

DESCRIPTION OF EMBODIMENTS

Figure 1:
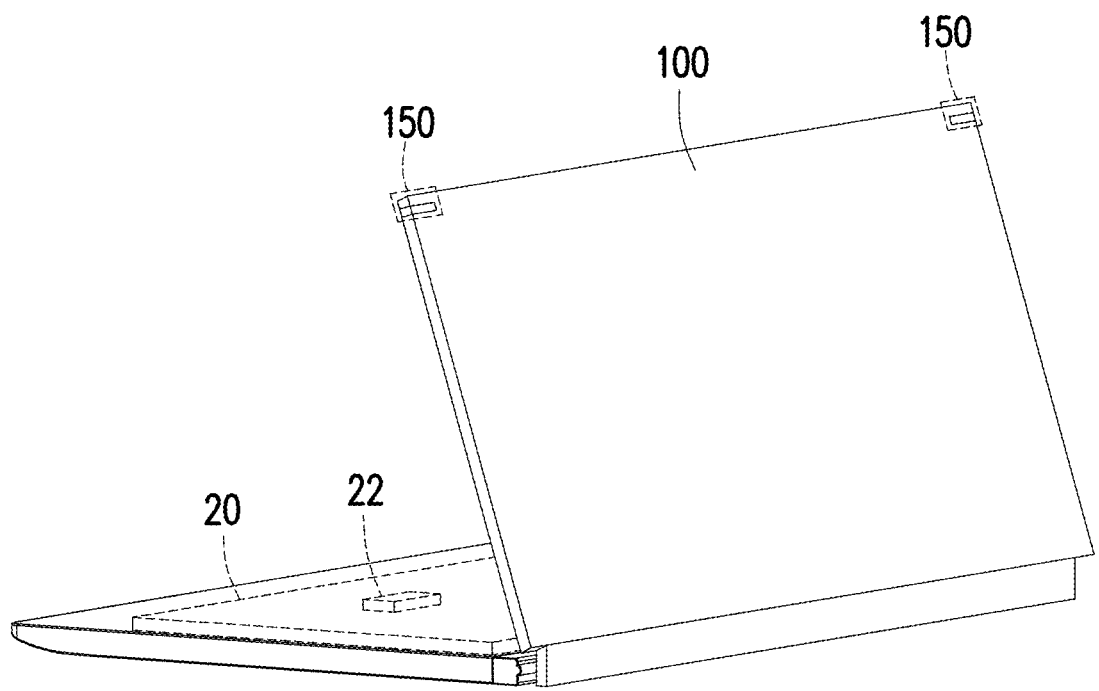
FIG. 1 is a schematic perspective view of an electronic device according to an embodiment of the disclosure.

FIG. 1 is a schematic perspective view of an electronic device according to an embodiment of the disclosure. Referring to FIG. 1, an electronic device 10 of the exemplary embodiment is exemplified as a notebook computer, but the disclosure is not limited thereto. In other embodiments, the electronic device 10 may be other electronic devices such as a mobile phone or a tablet computer. In the exemplary embodiment, the electronic device 10 has an upper body and a lower body. The upper body includes a back cover 100, and the lower body includes a circuit board 20.

In the exemplary embodiment, the back cover 100 is provided with two antenna structures 150, wherein the two antenna structures 150 are in a symmetrical configuration and adjacent to a corner of the upper body of the electronic device 10. The circuit board 20 includes a wireless communication module 22. Two coaxial transmitting wires 30 (shown in FIG. 4) are extended from the upper body to the lower body to connect the two antenna structures 150 to the wireless communication module 22, respectively. It should be noted that, in FIG. 1, the circuit board 20 and the wireless communication module 22 are indicated by dash lines because they are located inside the electronic device 10, the configuration thereof is only schematically illustrated, and the disclosure provides no limitation to the position of the configuration. In addition, in other embodiments, number of the antenna structures 150 may be one, which is not limited by the disclosure.

Figure 2:
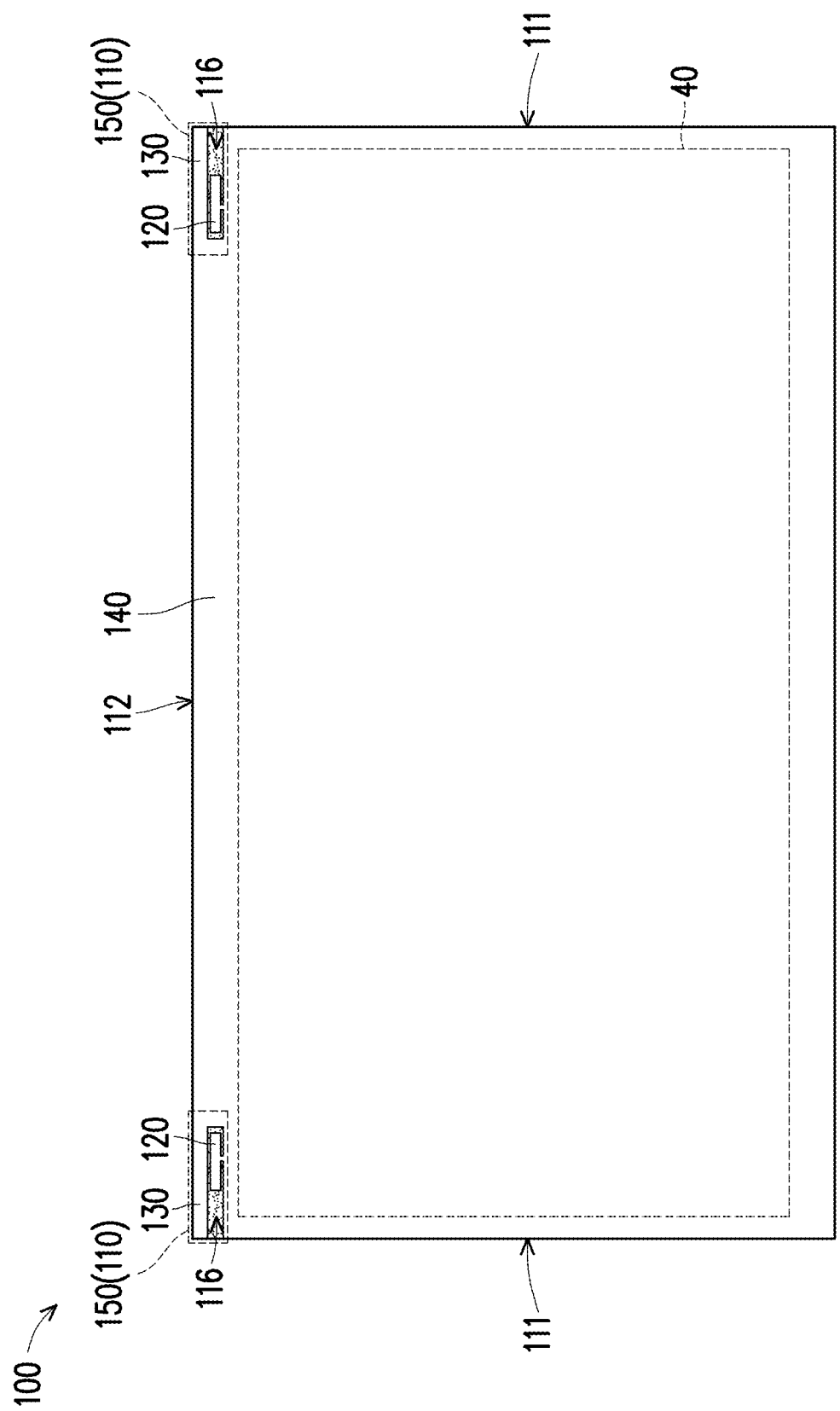
FIG. 2 is a schematic view of a back cover of the electronic device in FIG. 1.

FIG. 2 is a schematic view of a back cover of the electronic device in FIG. 1. As shown in FIG. 2, in the exemplary embodiment, the back cover 100 includes a metal body 110. The metal body 110 has two first sides 111 opposite to each other, a second side 112 connecting the two first sides 111, and two grooves 116 formed (recessed) at the first sides 111, respectively. More specifically, each of the grooves 116 is extended in a direction parallel to the second side 112 and forms an opening at the first side 111. In the exemplary embodiment, as shown in FIG. 2, two antenna structures 150 are formed in a small area on an upper left side and a small area on an upper right side of the back cover 100. Detailed descriptions are provided below with exemplification of the antenna structure 150 on the upper right side.

As shown in FIG. 2, the metal body 110 includes two first radiators 120, two second radiators 130, and a ground radiator 140. In the exemplary embodiment, one of the first radiators 120 and a corresponding one of the second radiators 130 as well as the other one of the first radiators 120 and a corresponding one of the second radiators 130 are symmetrically disposed on the metal body 110.

Figure 3:
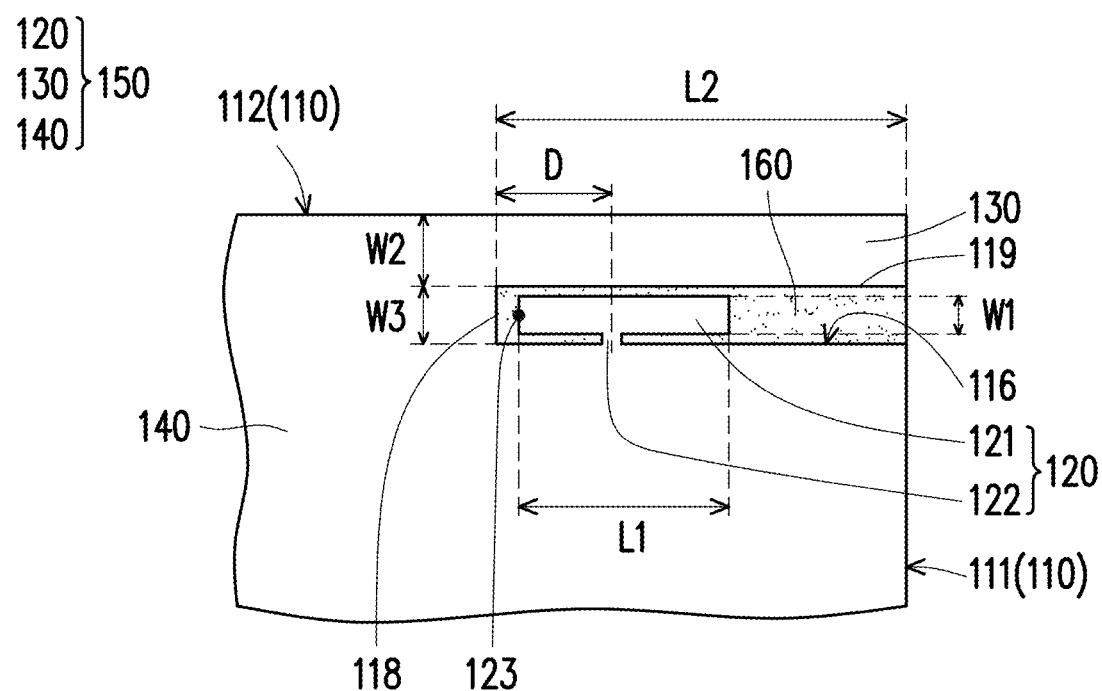
FIG. 3 is a partial enlargement view of the electronic device in FIG. 2.
Figure 4:
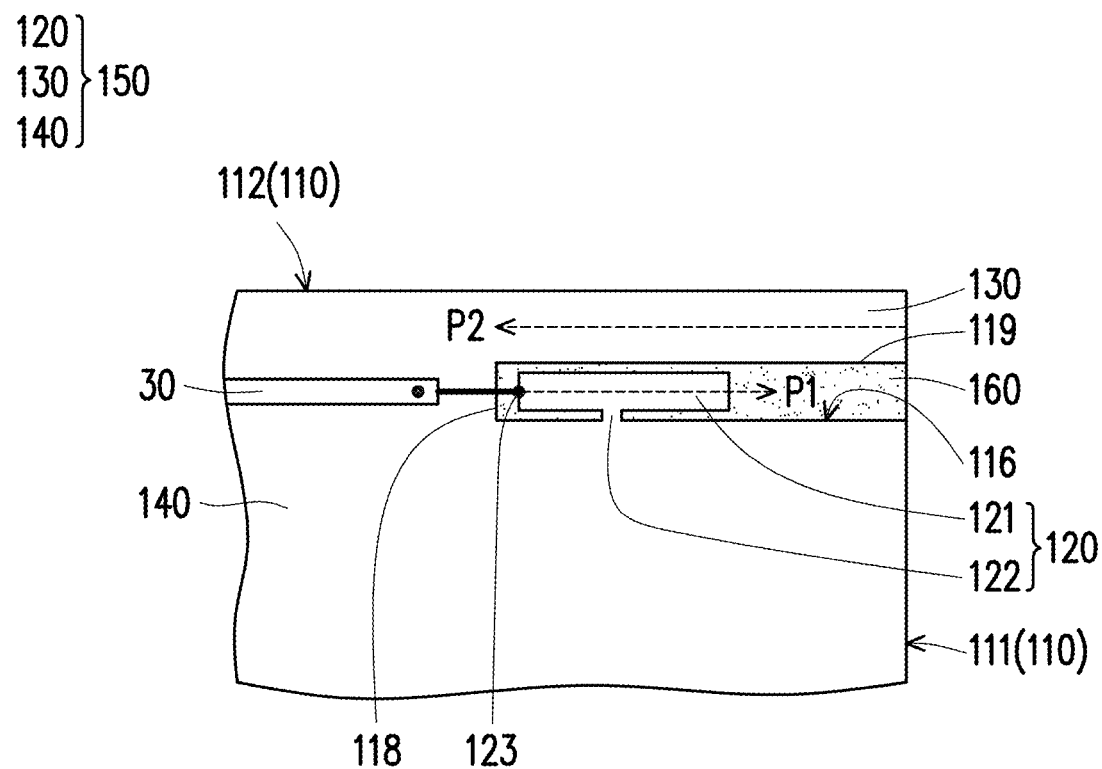
FIG. 4 is a schematic view illustrating a coaxial transmitting wire configured on FIG. 3.

FIG. 3 is a partial enlargement view of the electronic device in FIG. 2. FIG. 4 is a schematic view illustrating a coaxial transmitting wire configured on FIG. 3. Referring to FIG. 3 and FIG. 4, in the exemplary embodiment, the first radiator 120 is located within the groove 116. The first radiator 120 has a main portion 121 and a support portion 122. The main portion 121 and the support portion 122 cooperatively form a T-shape. Each of the grooves 116 has a closed end 118. The main portion 121 includes a feeding end 123 adjacent to the closed end 118 of the groove 116. The first radiator 120 is operated in a first band. As shown in FIG. 4, in the exemplary embodiment, a positive end of the coaxial transmitting wire 30 is connected to the feeding end 123, and a negative end is connected to the ground radiator 140 to transmit a received antenna signal to the wireless communication module 22 (shown in FIG. 1).

Returning to FIG. 3, the second radiator 130 is adjacently connected to an edge 119 (i.e., an upper edge of the groove 116 in FIG. 3) of the groove 116 and is located outside of the groove 116. The second radiator 130 is defined by the first side 111, the second side 112, and the edge 119 of the corresponding groove 116. The second radiator 130 is substantially straight, and is parallel to the first radiator 120. The second radiator 130 is operated in a second band.

The ground radiator 140 is formed by a portion of the metal body 110 that excludes the first radiator 120 and the second radiator 130, that is, a remaining portion of the metal body 110 excluding the first radiator 120 and the second radiator 130 is the ground radiator 140. The second radiator 130 and the support portion 122 of the first radiator 120 are connected to the ground radiator 140. Further, the first radiator 120, the corresponding second radiator 130, and the ground radiator 140 cooperatively serve as the antenna structure 150.

In the exemplary embodiment, a frequency of the first band of the first radiator 120 is higher than a frequency of the second band of the second radiator 130. Further, the first band is between 5.15 GHz and 5.85 GHz, and the second band is between 2.4 GHz and 2.5 GHz, thereby enabling the antenna structure 150 to support dual band operation of 2.4 GHz/5 GHz. It should be noted that the disclosure provides no limitation to the frequencies of the first band and the second band.

Referring to FIG. 3, in the exemplary embodiment, a width (W3) of the groove 116 is between 2 millimeters and 2.5 millimeters, and preferably, the width (W3) of the groove 116 is about 2.2 millimeters. A length (L1) of the main portion 121 is about ¼ times a wavelength of the first band and is between 10 millimeters and 12.5 millimeters. Preferably, the length (L1) of the main portion 121 is about 10 millimeters. The main portion 121 has a width (W1) between 1.5 millimeters and 2 millimeters.

In the exemplary embodiment, a length (L2) of the second radiator 130 is equal to a recess depth of the groove 116, and is about ¼ times a wavelength of the second band, that is, one end of the second radiator 130 corresponding to the ground radiator 140 is aligned with the closed end 118 of the groove 116. A distance (D) between the support portion 122 of the first radiator 120 and the feeding end 123 is between ½ and ⅔ times the length (L1) of the main portion 121. A sum of a width (W2) of the second radiator 130 and the width (W3) of the corresponding groove 116 is less than or equal to 5 millimeters. According to the above numerical values, size of the antenna structure 150 of the exemplary embodiment is considerably small.

Returning to FIG. 2, in the exemplary embodiment, the electronic device 10 further includes a display screen 40. An orthogonal projection of the display screen 40 with respect to the back cover 100 does not overlap the antenna structure 150. Since the size of the antenna structure 150 is considerably small, a larger size may be selected for the display screen 40, thereby providing a designer with more choices. Of course, in other embodiments, the orthogonal projection of the display screen 40 with respect to the back cover 100 may overlap the antenna structure 150, the disclosure provides no limitation thereto.

Referring to FIG. 4, in the exemplary embodiment, a direction of a resonant path (P1) of the first radiator 120 faces toward the first side 111 from the feeding end 123, and a direction of a resonant path (P2) of the second radiator 130 faces toward the ground radiator 140 from the first side 111. The resonant path (P1) of the first radiator 120 is opposite to and parallel with the resonant path (P2) of the second radiator 130. Further, the first band (high-frequency band) and the second band (low-frequency band) have independent resonant paths so that each band does not interfere with each other. Therefore, the high frequency and low frequency characteristics of the antenna structure 150 of the disclosure may be independently controlled or adjusted, which facilitates to improve the quality of communication of the electronic device 10.

It should be noted that different segments of the metal body 110 constitute the first radiator 120, the second radiator 130, and the ground radiator 140, respectively. In other words, in the exemplary embodiment, the metal body 110 not only serves as the back cover but also directly serves as the antenna structure 150. Since the metal body 110 inherently provides a certain degree of support, there is no need for the antenna structure 150 to be formed on a substrate (such as a Flame Retardant 4 (FR4) substrate, a printed circuit board (PCB) or a flexible printed circuit board (FPCB)).

Compared with a conventional electronic device in which the antenna structure is disposed inside the upper body, since the antenna structure 150 of the electronic device 10 of the exemplary embodiment is exposed, there is no need to provide the antenna structure 150 in the upper body, so that a thickness of the upper body may be reduced. Moreover, it is not required for the electronic device 10 of the exemplary embodiment to arrange the antenna structure 150 at the frame, thereby achieving the design of narrow frame. In this manner, the electronic device 10 of the disclosure may be designed with both a metal material and a narrow frame.

In the exemplary embodiment, the back cover 100 further includes at least one non-conductor filler 160, wherein number of the non-conductor filler 160 is two and the non-conductor fillers 160 are filled in the two grooves 116, respectively. The back cover 100 fills the space within the groove 116 via the non-conductor fillers 160, thereby enhancing the appearance and structural strength of the back cover 100. In the exemplary embodiment, the non-conductor filler 160 is, for example, a resin, plastic or other suitable non-conductor material.

Figure 5:
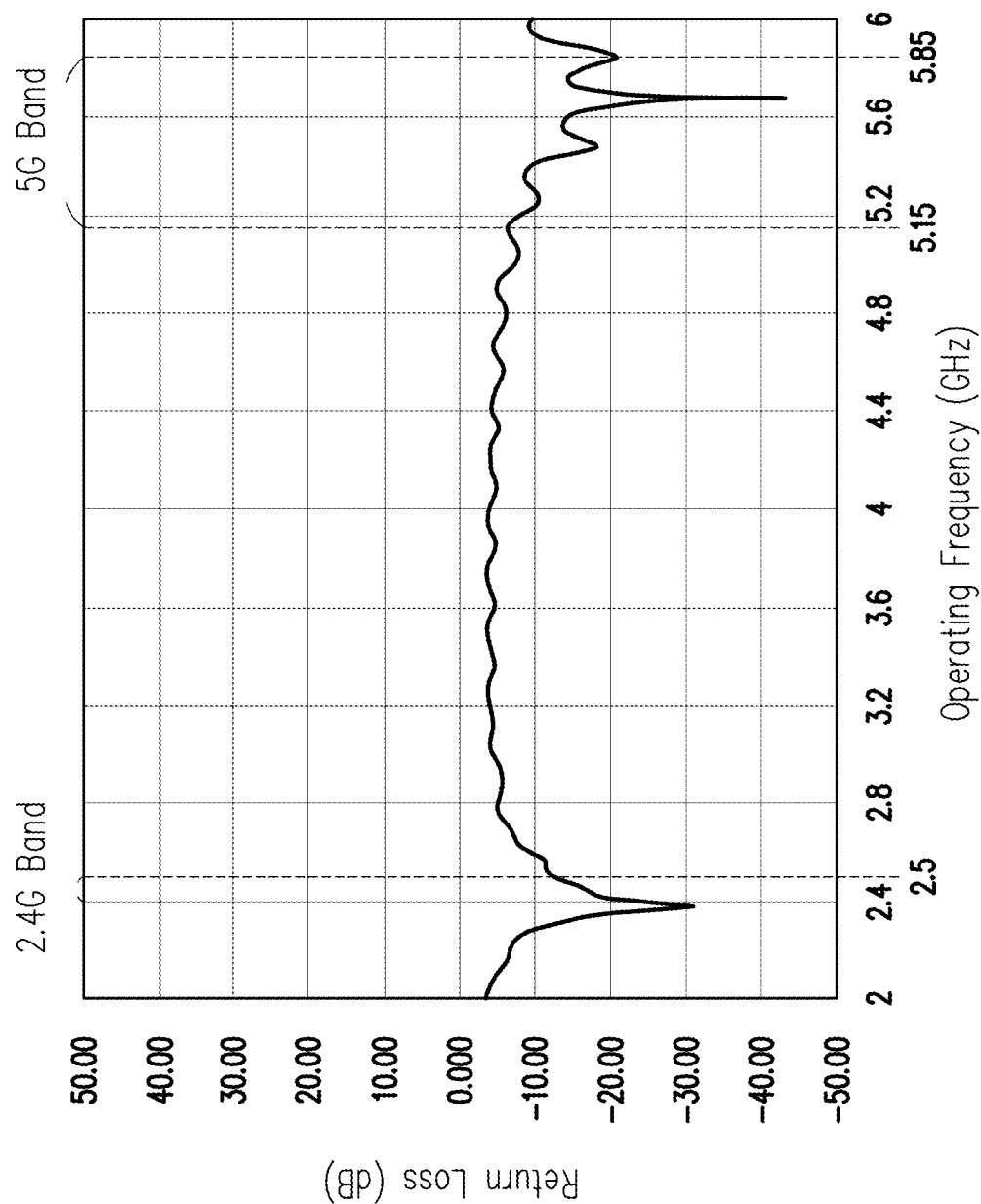
FIG. 5 is a diagram showing relationship between operating frequency and return loss of an antenna structure of the electronic device in FIG. 1.

FIG. 5 is a diagram showing relationship between operating frequency and return loss of an antenna structure of the electronic device in FIG. 1. Referring to FIG. 5, the return loss of −10 dB is set as a standard, return losses of the antenna structure 150 in this embodiment in the first band (corresponding to a frequency of 5.15 GHz to 5.85 GHz) and the second band (corresponding to a frequency of 2.4 GHz to 2.5 GHz) are all approximately below −10 dB. In view of the above, the antenna structure 150 has good performance in terms of the return losses in the first band (5G band) and the second band (2.4G band), and a bandwidth performance is also quite sufficient, thereby providing good impedance matching and improving the quality of signal transmission.

Figure 6:
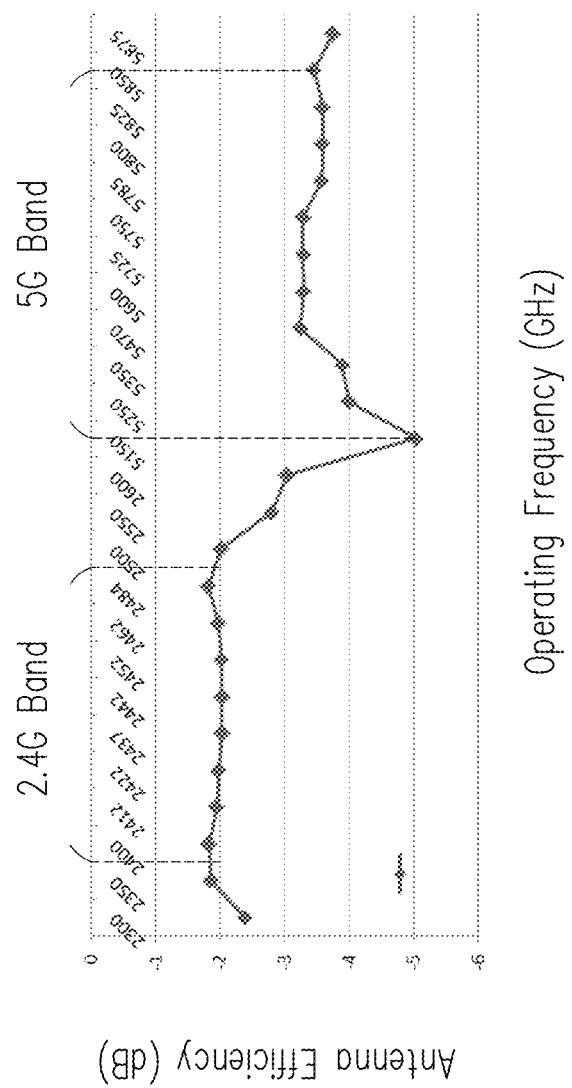
FIG. 6 is a diagram showing relationship between operating frequency and antenna efficiency of the antenna structure of the electronic device in FIG. 1.

FIG. 6 is a diagram showing relationship between operating frequency and antenna efficiency of the antenna structure of the electronic device in FIG. 1. Referring to FIG. 6, an antenna efficiency of −4 dB is set as a standard, the antenna structure 150 has an antenna efficiency of about −3.5 dB to −5 dB in the first band (corresponding to a frequency of 5150 MHz to 5850 MHz), and the antenna structure 150 has an antenna efficiency of about −2 dB in the second band (corresponding to a frequency of 2400 MHz to 2500 MHz). It can be seen that the antenna structure 150 of the exemplary embodiment has an antenna efficiency of approximately more than −4 dB in the first band and the second band, and has good performance in terms of the antenna efficiency, which meets the requirements of practical applications, so that the electronic device 10 of the disclosure can be stably applied to dual-frequency operation.

In summary, the back cover of the disclosure has a metal body, and a groove is directly opened on a side of the metal body to form an antenna structure that is cooperatively formed by the first radiator, the second radiator, and the ground radiator. Since the first radiator, the second radiator, and the ground radiator are a portion of the metal body, the metal body of the disclosure itself directly serves as the antenna structure, which can eliminate the substrate conventionally required for carrying the antenna, and reduce the thickness of the electronic device. Moreover, since the antenna structure does not need to be placed at the frame, the electronic device can be designed with a narrow frame. In addition, the first radiator and the second radiator have independent resonant paths, so that the corresponding high-frequency band and low-frequency band can be separately controlled or adjusted, which facilitates to improve the communication quality of the electronic device. Furthermore, with the arrangement of the sizes of the first radiator, the second radiator, and the groove, the antenna structure of the disclosure has good return loss and antenna efficiency, so that the electronic device performs well in dual-frequency operation.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A back cover for electronic device, the back cover comprising:
   a metal body, having at least one first side, a second side adjacent to the at least one first side, and at least one groove formed at the at least one first side, the metal body further having:
      at least one first radiator, disposed in the at least one groove, wherein each of the at least one first radiator has a main portion and a support portion, the main portion and the support portion cooperatively form a T-shape, the main portion includes a feeding end adjacent to a closed end of the groove, each of the at least one first radiator is operated in a first band;
      at least one second radiator, adjacently connected to the at least one groove and defined by the at least one first side, the second side, and at least one edge of the at least one groove, each of the at least one second radiator operated in a second band; and
      a ground radiator, formed by a portion of the metal body that excludes the at least one first radiator and the at least one second radiator, the at least one second radiator and the at least one support portion connected to the ground radiator, wherein the at least one first radiator, the at least one second radiator, and the ground radiator cooperatively serve as at least one antenna structure.

2. The back cover according to claim 1, wherein a width of each of the at least one groove is between 2 millimeters and 2.5 millimeters.

3. An electronic device, comprising:
   the back cover according to claim 2;
   a circuit board, including a wireless communication module; and
   at least one coaxial transmitting wire, connecting the at least one antenna structure to the wireless communication module.

4. The back cover according to claim 1, wherein a length of the main portion is between 10 millimeters and 12.5 millimeters, and a width of the main portion is between 1.5 millimeters and 2 millimeters.

5. An electronic device, comprising:
   the back cover according to claim 4;
   a circuit board, including a wireless communication module; and
   at least one coaxial transmitting wire, connecting the at least one antenna structure to the wireless communication module.

6. The back cover according to claim 1, wherein a length of each of the at least one first radiator is ¼ times a wavelength of the first band, and a length of each of the at least one second radiator is equal to a recess depth of each of the at least one groove, and the length of each of the at least one second radiator is ¼ times a wavelength of the second band.

7. An electronic device, comprising:
   the back cover according to claim 6;
   a circuit board, including a wireless communication module; and
   at least one coaxial transmitting wire, connecting the at least one antenna structure to the wireless communication module.

8. The back cover according to claim 1, wherein a distance between the support portion of the first radiator and the feeding end is between ½ and ⅔ times a length of the main portion.

9. An electronic device, comprising:
   the back cover according to claim 8;
   a circuit board, including a wireless communication module; and
   at least one coaxial transmitting wire, connecting the at least one antenna structure to the wireless communication module.

10. The back cover according to claim 1, wherein a sum of a width of each of the at least one second radiator and a width of a corresponding one of the at least one groove is less than or equal to 5 millimeters.

11. An electronic device, comprising:
    the back cover according to claim 10;
    a circuit board, including a wireless communication module; and
    at least one coaxial transmitting wire, connecting the at least one antenna structure to the wireless communication module.

12. The back cover according to claim 1, further comprising at least one non-conductor filler filled in the at least one groove.

13. An electronic device, comprising:
    the back cover according to claim 12;
    a circuit board, including a wireless communication module; and
    at least one coaxial transmitting wire, connecting the at least one antenna structure to the wireless communication module.

14. The back cover according to claim 1, wherein the at least one first side includes two first sides, the two first sides are opposite to each other, the second side is located between the two first sides and connected to the two first sides, the at least one first radiator includes two first radiators, the at least one second radiator includes two second radiators, one of the first radiators and a corresponding one of the second radiators as well as the other one of the first radiators and a corresponding one of the second radiators are symmetrically disposed on the metal body.

15. An electronic device, comprising:
    the back cover according to claim 14;
    a circuit board, including a wireless communication module; and
    at least one coaxial transmitting wire, connecting the at least one antenna structure to the wireless communication module.

16. An electronic device, comprising:
    the back cover according to claim 1;
    a circuit board, including a wireless communication module; and
    at least one coaxial transmitting wire, connecting the at least one antenna structure to the wireless communication module.

17. The electronic device according to claim 16, further comprising a display screen, wherein an orthogonal projection of the display screen with respect to the back cover does not overlap the at least one antenna structure.

* * * * *